3,497,551
PROCESS FOR PREPARING METHYL
2,5-HEXADIENOATE
Gian Paolo Chiusoli, Mario Ferraris, and Franco
Guerrieri, Novara, Sergio Merzoni, Milan, and
Giuseppe Mondelli, Novara, Italy, assignors to
Montecatini Edison S.p.A., Milan, Italy
No Drawing. Filed Feb. 20, 1967, Ser. No. 617,039
Claims priority, application Italy, Feb. 21, 1966,
14,715
Int. Cl. C07c 69/52
U.S. Cl. 260—486                                    3 Claims

ABSTRACT OF THE DISCLOSURE 2,5-hexadienoate and its derivatives, sorbic acid as K or Na salt, are prepared from allyl chloride, acetylene and carbon monoxide as starting materials. New catalyst sytem of nickel chloride, thiourea and manganese or iron-manganese alloy is used to prepare the 2,5-hexadienoate. This is reacted with NaOH or KOH to form the respective sorba te.

---

Our present invention relates to a process for preparing methyl 2,5-hexadienoate and its derivatives, in particular sorbic acid as sodium or potassium salt, from allyl chloride, acetylene and carbon monoxide according to the reactions:

(1)
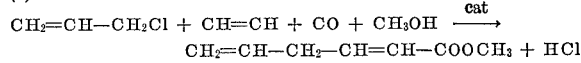
$$CH_2=CH-CH_2Cl + CH\equiv CH + CO + CH_3OH \xrightarrow{cat}$$
$$CH_2=CH-CH_2-CH=CH-COOCH_3 + HCl$$

(2)
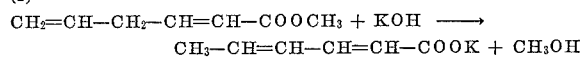
$$CH_2=CH-CH_2-CH=CH-COOCH_3 + KOH \longrightarrow$$
$$CH_3-CH=CH-CH=CH-COOK + CH_3OH$$

Italian Patent No. 589,731, of Mar. 12, 1959, discloses that the three starting compounds can react in methyl alcohol forming cis methyl 2,5-hexadienoate. Nickel-carbonyl, which is partially decomposed during the reaction to nickel chloride, is required for this reaction. Italian patent application No. 7,814/64 filed on Apr. 10, 1964 discloses that it is possible to substitute the Fe—NiCl₂— thiourea system for the nickel carbonyl. Under these conditions, the reaction rate is slow, only limited conversions are obtained and it is necessary to use very large amounts of nickel chloride.

We have surprisingly found that an active catalyst can be easily prepared by contacting powdered manganese or powdered MnFe alloys with $NiCl_2$ and thiourea. It is preferable to use the alloys instead of manganese because manganese causes some evolution of hydrogen and partial reduction of allyl chloride to propylene. Using an alloy containing 80% Mn and 20% Fe permits complete conversions even with very small amounts of nickel chloride. Also technical Mn-Fe alloys can be used. They usually also contain other elements such as C and Si. The carbon content in the alloys at 80% Mn should preferably be kept between 0.1 and 5%. Higher carbon contents markedly reduce the activity of the alloy, while carbon contents less than 0.1% give rise to secondary reactions.

The reactants are preferably used in the following molar ratios:

| | |
|---|---|
| Methanol: allyl chloride | From 10 to 100. |
| $NiCl_2$: allyl chloride | From 0.02 to 0.1. |
| Mn: $NiCl_2$ | Above 1. |
| Thiourea: $NiCl_2$ | From 0.5 to 5. |
| CO: $C_2H_2$ | From 2:1 to 1:2. |

The reaction is carried out at temperatures between 0° and 60° C., and preferably between 15 and 30° C. Generally, small amounts of water arising from the hydrated nickel chloride and from the neutralization of the hydrochloric acid or from the moisture of the gases are present. It is preferable that the water content be less than 5% on the weight of the reaction mixture.

The catalyst can be introduced all at the start of the reaction, or in increments during the reaction if this tends to slow down.

Single ingredients of the catalyst may be added separately during the reaction.

We obtain good yields and good conversions in spite of using such small amounts of catalyst that the recovery thereof can be avoided. In order to remove the hydrochloric acid, which is released in the course of the reaction, neutralizing agents such as MgO and CaO are used.

Thus, we have a very simple process which leads to methyl 2,5-hexadienoate by a single passage, at room temperature without employing nickel carbonyl.

At the end of the reaction, it is sufficient to decant from the solid and subject the mixture to distillation. Methyl alcohol is distilled, which can be recycled. It is easily separated from hexadiene which goes to the head as azeotrope with water. The hexadienoate thus produced is then purified by steam distillation or by distillation under vacuum. By reaction with caustic soda or potash, isomerization of the compound 2,5 to 2,4 and saponification occur.

The reaction is preferably carried out under reflux with a 10–30% NaOH or KOH solution; a 10–30% excess of alkaline hydroxide is used. The excess alkali is neutralized, preferably with sorbic acid.

The alkaline sorbate thus obtained can be purified by washing with oxygenated organic solvents, selected from alcohols, ketones, esters, having at least 3 C and boiling at temperature lower than 1000° C. The preferred solvent is acetone. In fact, it has been found that the use of caustic soda and potash on the hexadienoate leads directly to a salt which can be purified by washing without other crystallizations.

The sodium or potassium salt of the sorbic acid is useful, as known, for the preservation of foods and for many other uses. The acid itself can be set free from the salt according to the conventional art. The formation of 2,5 hexadienoate is accompanied by formation of minor amounts of 1,5-hexadiene, propylene, methyl cyclopentenonylacetate (compound I), methyl 5-cyclopentenonyl-levulinate (compound II), phenol as by-products.

(I)
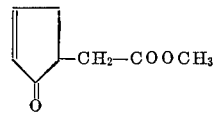

(II)
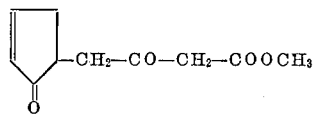

Sulphurated compounds are also present in low amounts.

These compounds are easily removed partly during the distillation of the hexadienoate and partly during the washing of the alkaline sorbate with the organic solvent.

Mixtures of methyl hexadienoate with hexadienoic esters of higher alcohols can be prepared according to the process of the present invention by using mixtures of methanol with higher alcohols as reaction medium.

The following examples are for illustration and not to limit the claimed invention.

EXAMPLE 1

The apparatus used consists of a one liter five-neck flask, equipped with thermometer, mechanical agitator, reflux condenser, cooled with liquid ammonia, dipping tube for the introduction of the gaseous mixture, which is recycled by a pump from a surge tank, dropping funnels for the introduction of the reactants and a device for charging of powders. The flask is immersed in a thermostatic system whereby the desired temperature is maintained.

After washing with a gaseous mixture (55% $C_2H_2$ and 45% CO by volume), 300 cc. of methanol and 6.5 g. of magnesium oxide are introduced in the flask. The whole is saturated with the gas mixture for about 30 minutes. 2 g. of manganese-iron alloy (80% Mn and 20% Fe), finely divided and screened at above 25,000 mesh/cm.$^2$, 5 g. of 99.1% allyl chloride containing 0.9% of isopropenyl-chloride, 2 g. of nickel chloride hexahydrate dissolved in 15 cc. of methanol and 0.6 g. of thiourea dissolved in 15 cc. of methanol are introduced. Lively gas absorption and heat development is noted. The temperature is kept at 25° C. by means of a water bath.

An additional 20.3 g. of allyl chloride, dissolved in 25 cc. of methanol, are fed within 2 hours, maintaining the recycle of the gas with a 35–40 l./h. flow. After this time, the adsorption rate of the gases diminishes. An additional 2 g. of Mn-Fe alloy powder, 2 g. of nickel chloride hexahydrate in 15 cc. of methanol and 0.6 g. of thiourea in 15 cc. of methanol are then added and the absorption of the gases is again very lively with heat evolution. After a further 2 hours, when the gas adsorption rate again diminishes, an addition of 0.25 g. of thiourea in 10 cc. of methanol causes the renewal of the gas adsorption.

After 8 hours, when the volume of the adsorbed gases corresponds about to the theoretical calculated volume, the adsorption stops. The yellow liquid is filtered off, separating it from the magnesium oxide and from the excess of manganese-iron alloy. The liquid is then distilled. On water bath, a fraction consisting of methanol containing 0.5 g. of non-reacted allyl-chloride, 0.2 g. of isopropenyl-chloride and 0.3 g. of 1,5-hexadiene, is distilled off. Together with the last fractions of methanol, an azeotrope distills off, which is collected separately, and which contains water and 2.15 g. of cis-methyl 2,5-hexadienoate.

The distillation residue is acidified with 10% sulphuric acid and is extracted many times with diethyl ether. After drying the ether extract with magnesium sulphate, the ether is distilled at normal pressure. Then, under vacuum, a fraction boiling at 46–52° C. at 13 mm. Hg, containing 28.45 g. of ester, consisting of cis-methyl 2,5-hexadienoate and little amounts of its isomers, is distilled off; then follows a fraction of 2.65 g. boiling up to 100° C. at 1 mm. Hg and containing methyl cyclopentenonyl-acetate (compound I) together with small amounts of other products.

The residue (1.8 g.) contains about 50% of methyl cyclopentenonyl-levulinate (compound II, B.P. 100–110° C./0.001 mm. Hg) and little amounts of phenyl hexadienoate together with other products in the residue gas, 0.2 g. of propylene and traces of hexadiene and allyl chloride are found.

The whole of the methyl hexadienoate thus obtained (30.6 g.) is heated under nitrogen with 10% potassium hydroxide for 1 h., 30 minutes at 100° C. under agitation, using a 20% excess of caustic poatsh. During this operation, methanol is released and is recovered.

Thus, the isomerization and the saponification to potassium sorbate is obtained. At the end, the excess caustic potash is neutralized with sorbic acid, the water is removed by distillation, and the potassium sorbate is dried under vacuum with an almost quantitative yield on the methyl hexadienoate. The potassium sorbate thus obtained is washed with acetone in order to obtain the pure product (trans-trans).

EXAMPLE 2

The apparatus used consists of a 5-liter five-neck flask, equipped with thermometer, mechanical stirrer, reflux condenser cooled with liquid ammonia, dipping tube for feeding the gaseous mixture, dropping funnel for introducing the reactants and a device for introducing powders. The gaseous mixture is circulated continuously and is metered at the inlet and at the outlet by flowmeters. The flask is immersed in a thermostatic bath which allows maintaining the desired temperature.

The flask is swept clean with the gaseous mixture (50% $C_2H_2$ and 50% CO by volume) and is charged with 1500 cc. of methanol, obtained by distilling previous runs, containing 0.4 g. of organic sulfur. The methanol is saturated with the gaseous mixture for two hours. Thereafter, added at the same time, are: 10 g. of Mn-Fe alloy (79.5% Mn, 16% Fe, 1.42% C, 0.8% Si), finely ground and screened between 37,000 and 50,000 mesh/cm.$^2$; 32.5 g. of MgO; 10 g. of nickel chloride hexahydrate and 1.5 g. of thiourea.

500 cc. of a solution of 123.4 g. of allyl chloride, 10 g. of nickel chloride hexahydrate and 3 g. of thiourea in recycle methanol are dropped in over 5 hours. The reaction starts rapidly with lively gas absorption and heat evolution. The temperature is kept at 26–27° C. by a water bath and pieces of ice. Two grams of alloy are added after the first, second and third hour of dropping, and 4 g. after the fourth hour. A gaseous mixture (47% $C_2H_2$ and 53% CO by volume) is fed during the run. The stirring is kept at high values.

Two traps, cooled with solid $CO_2$, placed after the cooler, permits recovery of the allyl chloride and the light products entrained mechanically by the vent gas. The content of the traps is recycled after 2.5 and 5 hours of reaction. After 6 hours the gas absorption decreases sensibly and after 8 hours the reaction is practically ended. The suspension is discharged and filtered. The cake is washed with methanol. The filtrates are joined and distilled on a water bath. The first fraction consists of methanol, containing 0.42 g. of unreacted allyl chloride, 0.42 g. of isopropenyl chloride, and 2.22 g. of 1,5-hexadiene. Together with the last fractions of methanol, an azeotrope distills off which is collected separately and which contains water and 4.2 g. of methyl 2,5-hexadienoate cis.

By operating as described in the preceding example, 145.4 g. of ester, consisting of methyl 2,5-hexadienoate cis and of small amounts of its isomers, are obtained. The residue, with the high-boiling by-products, weighs 25.5 g.

The thus obtained methyl hexadienoate is treated with potassium hydroxide to give the pure (trans-trans) potassium sorbate.

We claim:

1. A process for producing methyl 2,5-hexadienoate from allyl chloride, acetylene, carbon monoxide and methanol, wherein the reaction is carried out in methanol, at atmospheric pressure and at temperatures from 0° to 60° C., in contact with a catalyst based on nickel chloride, manganese powder and thiourea, the amount of nickel chloride being from 0.02 to 0.1 mols for one mol of allyl chloride, the manganese being above 1 mol for 1 mol of $NiCl_2$, the thiourea being from 0.5 to 5 mols for 1 mol of $NiCl_2$.

2. A process according to claim 1, wherein the manganese powder is in form of the ferro-manganese alloy, this alloy containing about 80% of manganese.

3. A process according to claim 1, wherein the molar ratio $CO:C_2H_2$ is from 2:1 to 1:2.

References Cited

UNITED STATES PATENTS

| 3,048,621 | 8/1962 | Stadler et al. | 260—486 XR |
| 3,060,227 | 10/1962 | Stadler et al. | 260—486 |

FOREIGN PATENTS

| 952,447 | 3/1964 | Great Britain. |

LORRAINE A. WEINBERGER, Primary Examiner

ALBERT P. HALLUIN, Assistant Examiner

U.S. Cl. X.R.

260—526